United States Patent [19]

Raishe et al.

[11] Patent Number: 4,911,310
[45] Date of Patent: Mar. 27, 1990

[54] HOLDER FOR COOKING UTENSIL COVERS

[76] Inventors: Thomas A. Raishe, 18235 Jupiter Landings Dr., Jupiter, Fla. 33458; Edward G. Arnold, 4710 Cherry Rd., West Palm Beach, Fla. 33417

[21] Appl. No.: 275,280

[22] Filed: Nov. 23, 1988

[51] Int. Cl.$^4$ .................................................. A47F 5/08
[52] U.S. Cl. ....................................... 211/87; 248/312; 211/41
[58] Field of Search .................. 211/87, 41, 13, 71, 211/88; 248/205.3, 205.1, 205.4, 309.1, 312, 311.2

[56] References Cited

U.S. PATENT DOCUMENTS

| D. 207,453 | 4/1967 | Hoffman | 211/41 X |
|---|---|---|---|
| 887,972 | 5/1908 | Sloan | 211/41 X |
| 1,842,118 | 1/1932 | Resnick et al. | 211/41 |
| 2,633,994 | 4/1953 | Brown | 211/41 |
| 2,767,854 | 10/1956 | Barrett | 211/41 X |
| 4,367,819 | 1/1983 | Lewis | 211/87 X |
| 4,492,307 | 1/1985 | Hargrave | 211/41 X |
| 4,776,469 | 10/1988 | Geleziunas | 211/41 |

*Primary Examiner*—Alvin C. Chin-Shue
*Assistant Examiner*—Sarah A. Lechok
*Attorney, Agent, or Firm*—Steele, Gould & Fried

[57] ABSTRACT

A holder for cooking utensil covers includes a portion adapted to engage the knob or handle of a cooking utensil cover, preferably by an upwardly opening slot. Mounting structure is provided by which to fix the knob engagement portion to a surface, especially the surface of a cabinet door. Tab portions extend outwardly from the knob engagement portion so as to engage a portion of the cover at a position that is distanced from the cover knob. The tab portions abut the cover to prevent tilt and to also prevent wobble when the cabinet door is opened.

15 Claims, 3 Drawing Sheets

HOLDER FOR COOKING UTENSIL COVERS

BACKGROUND OF THE INVENTION

1. Field of the Invention

This invention relates generally to article storage devices, and more particularly to holders for cooking utensil covers.

2. Description of the Prior Art

There is a continuing need for devices which will organize and store kitchen utensils. Cooking utensil covers are particularly difficult to store efficiently. The irregular shapes of the covers, and particularly their knobs or handles, interfere with efficient stacking of the covers. The covers must usually be stored in out of the way drawers, and are not close at hand in the kitchen for ready use.

A number of inventions have been directed to holders for cooking utenil covers. Dalton, U.S. Pat. No. 1,204,344, discloses a receptacle for pot lids wherein a strand of wire is shaped to encircle the pot lid. A loop is provided for hanging the receptacle on a projection secured to a wall or other surface. Parulski, U.S. Pat. No. 2,695,152, discloses a cooking utensil hanger with a hook for hanging a cooking receptacle and a support for its cover. Rosenthal, U.S. Pat. No. 2,165,654, discloses an article holder for cooking utensils wherein hangers adapted to hold the covers are pivotally mounted to a base that is fixed to a wall or the like. Hoffman, U.S. Pat. No. Des. 207,453, discloses a design for a pot cover holder. Princevalle, U.S. Pat. No. 3,326,387, discloses a portable lid holder with a pocket or recess adapted to engage the flange of a lid. Sarter, U.S. Pat. No. 1,065,000, discloses a utensil cover holder rack having a plurality of slotted hangers wherein the slots are adapted to engage the knobs of the covers. Sipe, U.S. Pat. No. 3,094,215, discloses a holder for covers formed from a length of wire that is formed into a plurality of connected loops.

Receptacles for cooking utensil covers can be conveniently placed on the inside surfaces of cabinet doors so that the covers will be close at hand in the kitchen. It is therefore desirable that the holder be of a minimum dimension so as not to interfere with the storage of goods in the cabinet. Prior art holders often do not firmly secure the covers in place. The covers can wobble and make a great deal of noise each time the cabinet is opened. The top end of the covers tilt forward, away from the cabinet, in many prior art constructions. This tilt can create a moment force which will cause the pot lid to rotate out of the holder and/or tend to dislodge the holder from the cabinet, particularly where an adhesive is used to secure the holder to the cabinet surface.

It would be desirable to provide a holder for cooking utensil covers which could be mounted to cabinet doors. It would further be desirable to provide a holder for cooking utensil covers which would require a minimum of space. It also would be desirable to provide a holder for cooking utensil covers which would hold the covers securely, without tilt, and which would retard wobble and noise as the cabinet doors are opened and closed.

SUMMARY OF THE INVENTION

It is an object of the invention to provide a holder for cooking utensil covers which could be mounted to cabinet doors.

It is another object of the invention to provide a holder for cooking utensil covers which would require a minimum space.

It is yet another object of the invention to provide a holder for cooking utensil covers which would hold the covers securely and retard wobble and noise as the cabinet doors are opened and closed.

It is still another object of the invention to provide a holder for cooking utensil covers which will prevent tilting of the covers and the resultant dislodging of the holder from the surface to which it is attached.

These and other objects are accomplished by a holder for cooking utensil covers which comprises a portion adapted to engage the knob of a cooking utensil cover. Structure for mounting the holder to a surface, preferably a cabinet door, is also provided. Tab portions extend outwardly from the knob engagement portion to engage the cover a distance from the knob to secure the cover against tilt and wobble.

The engagement portion is preferably a planar member having a substantially V-shaped, upwardly opening slot. Most knobs on cooking utensil covers are of a reduced diameter at the point of attachment to the cover, thereby forming a neck. The neck of the knob is engaged by the slot of the engagement portion to secure the cover. The mounting structure is preferably adapted to space the engagement portion a distance from the surface. This can be accomplished by a base portion or spacing arms connected between the engagement portion and the mounting structure. The knob of the cover, when engaged, can thereby be positioned between the slotted engagement portion and the surface.

One of the tabs is preferably positioned on each lateral side of the slot and beneath the knob of the cover, when engaged. The cover will thereby be engaged at the knob and at the tabs, representing engagement at plural locations in both the horizontal and vertical directions. This will retard tilt and wobble in both the vertical and horizontal planes.

BRIEF DESCRIPTION OF THE DRAWINGS

There are shown in the drawings embodiments which are presently preferred it being understood, however, that the invention is not limited to the precise arrangements and instrumentalities shown, wherein.

DETAILED DESCRIPTION OF THE PREFERRED EMBODIMENTS

Figure 4:
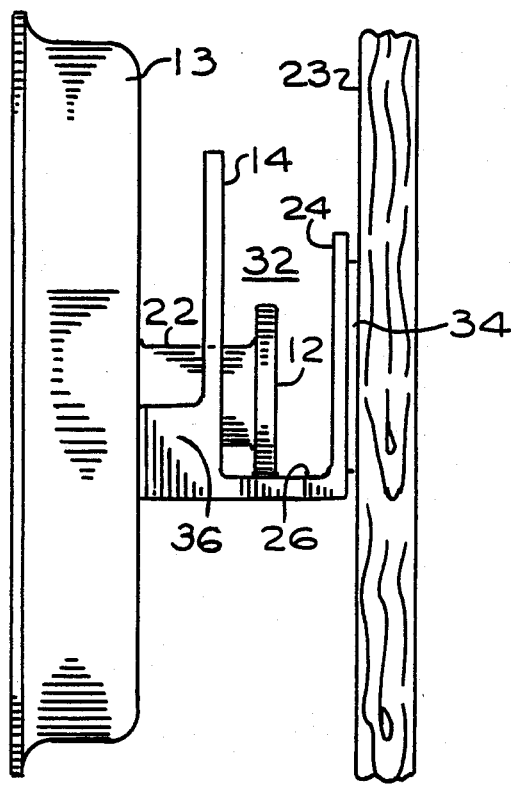
FIG. 4 is a side elevation depicting attachment to a cabinet surface and the engagement of a cooking utensil cover.

Referring to FIGS. 1-4, there is shown a holder 10 for cooking utensil covers. The holder 10 includes an engagement portion 14 adapted to engage the knob 12 of a cooking utensil cover 13 (FIG. 4). The engagement portion 14 is preferably a substantially planar member having a slot formed therein with side edges 16, 18 and a bottom edge 20. The slot is substantially V-shaped and upwardly opening, so as to engage a neck portion 22 of the cover 13.

Figure 1:
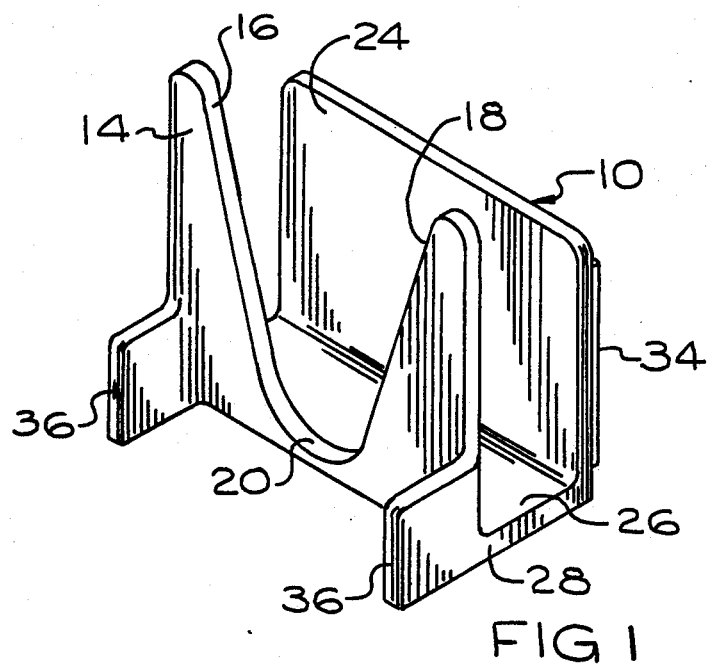
FIG. 1 is a perspective view of a holder for cooking utensil covers according to the invention.
Figure 2:
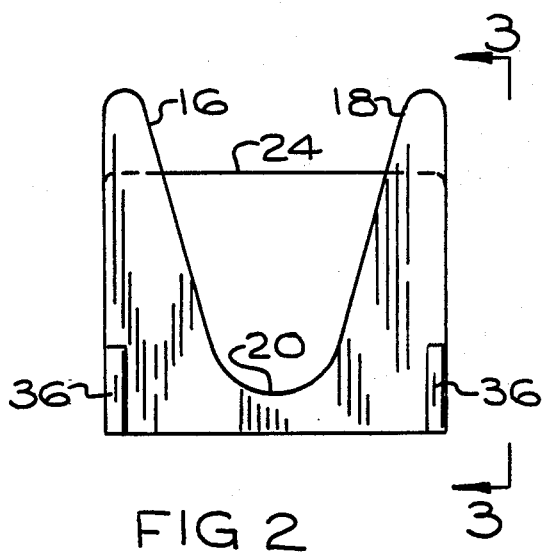
FIG. 2 is a front elevation.
Figure 3:
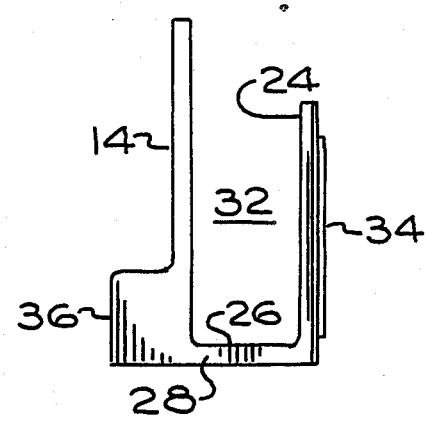
FIG. 3 is a side elevation.

Mounting structure positioned rearwardly from the engagement portion is adapted to fix the slotted engagement portion to a surface, such as the surface 23 of a cabinet door. The mounting structure may be selected from several suitable designs, and in one embodiment is a planar member substantially L-shaped in cross-section with an upstanding mounting portion 24 and a base portion 26. A distal edge portion 28 of the base portion 26 is joined to the slotted engagement portion 14 (FIG. 2). The slotted engagement portion 14 is preferably substantially perpendicular to the base portion 26 and substantially parallel and in spaced relation to the upstanding mounting portion 24. The knob 12 of the cover when engaged to the holder 10 therefore rests in the open space 32 (FIG. 4) between the upstanding mounting portion 24, the slotted portion 14 and the base portion 26.

Tab portions 36 extend outwardly and forwardly from the slotted engagement portion 14 to contact a portion of the cover 13. The tabs 36 can be substantially planar members, ends of which contact the cover 13 at a position distanced from the point of engagement between the slotted portion 14 and the knob 12. The tabs 36 in this embodiment are substantially aligned in a vertical plane.

Most covers engaged to cabinet doors have a tendency to tilt and to wobble when the cabinet doors are opened and closed. The tabs 36 prevent the tilt and also the wobble. One tab portion 36 is preferably provided on each lateral side of the engagement portion 14. The cover 13 will be engaged by the tabs on each lateral side of the knob 12, which engagement will substantially prevent wobble in the horizontal plane. The tabs 36 are preferably also positioned below the point of engagement between the slot and the knob 12, to substantially prevent wobble in the vertical planes. The cover will thereby be secured against both vertical and horizontal movement.

The dimensions of the hanger can be varied, especially to adapt to the dimensions of the particular cooking utensil covers which are to be engaged. One holder size that is useful for several common sizes of cooking utensil covers measures about 2.25 inches by about 0.75 inches by about 2.25 inches. The tab portions 36 extend outwardly from the engagement portion 14 a distance of between about 0.25 inches and about 1.0 inches, and preferably about 0.5 inches.

The upstanding mounting portion 24 can be secured to the surface by suitable fastening structure known in the art. A preferred fastening structure would be a double-sided adhesive pad 34. The double-sided pad 34 securely attaches the holder 10 to the cabinet surface 23 or to other surfaces. Other fastening structure is possible, for example, apertures dimensioned to receive suitable screws.

The invention can be made from several materials suitable for this purpose. Plastics are a desirable material because of their minimal expense, ease to mold, and resistance to corrosion. Polystyrene is a preferred plastic.

Figure 5:
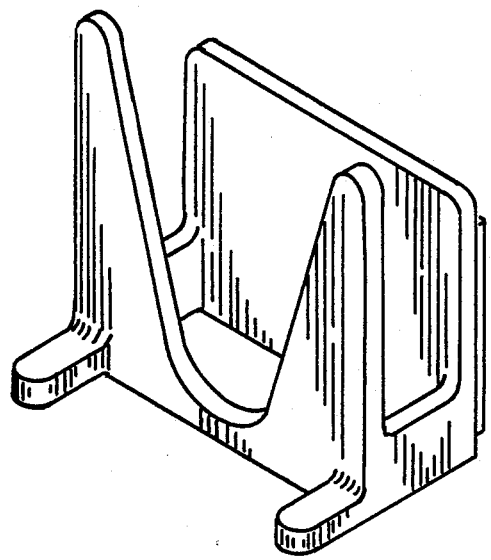
FIG. 5 is a perspective view of an alternative embodiment.
Figure 6:
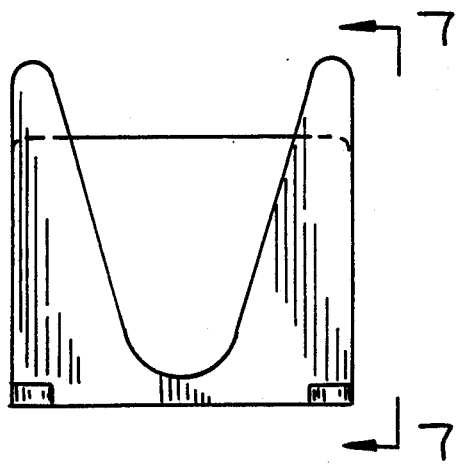
FIG. 6 is a front elevation.
Figure 7:
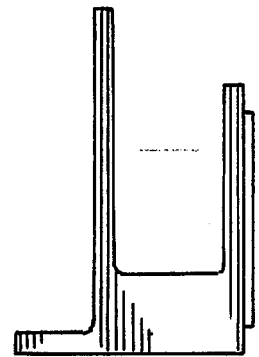
FIG. 7 is a side elevation.

Alternative embodiments are possible. One such alternative embodiment is shown in FIGS. 5-7. The holder 50 includes an engagement portion 52 which, as before, can include a slot with sides 56, 58 and a bottom edge 62. An upstanding mounting portion 66 is mounted to and spaced rearwardly from the knob engagement portion 52 in this embodiment by spacing arms 68 provided on each lateral side of the upstanding portion 66. They span between and engage the upstanding portion 66 to the mounting structure 52. Tabs 70 are provided on the slotted engagement portion 52 on each lateral side of and below the slot. The tabs 70 extend outwardly and forwardly, are substantially planar, and are substantially horizontally aligned. An adhesive pad 74, as before, can be used to secure the upstanding portion 66 to a surface.

Fewer or more of the tabs can be provided. The tabs can be dimensioned differently, can be designed differently, and can be provided in alternative and additional locations on the holder. The slotted engagement portion and the mounting structure can be provided in alternative embodiments. As the invention can be embodied in other specific forms without departing from the spirit or essential attributes thereof, reference should be made to the following claims, rather than to the foregoing specification, as indicating the scope of the invention.

We claim:

1. A holder for cooking utensil covers, comprising:
    an engagement portion adapted to engage the knob or handle of a cooking utensil cover;
    mounting structure positioned rearwardly from said engagement portion and adapted to fix the engagement portion to a surface; and,
    at least one tab portion extending outwardly and forwardly from the engagement portion and adapted to contact the cooking utensil cover at a position distanced from the knob or handle, whereby the cooking utensil cover will be contacted by the holder at the knob or handle and at portions of the cover abutting the tab portions, the plural points of contact firmly securing the cover against tilt and wobble of the cover with respect to the surface.

2. The holder of claim 1, wherein said engagement portion comprises a slotted portion adapted to engage the knob or handle.

3. The holder of claim 2, wherein said engagement portion is substantially planar.

4. The holder of claim 2, wherein at least one tab portion is provided on each lateral side of said slot.

5. The holder of claim 4, wherein at least one tab is provided substantially beneath said slot.

6. The holder of claim 5, wherein said tab portions are substantially planar members.

7. The holder of claim 2, wherein the mounting structure is substantially planar, and further comprising means for spacing the engagement portion a distance from said mounting structure.

8. The holder of claim 7, wherein said means for spacing said engagement portion a distance from the mounting structure comprises a base portion connected between said mounting structure and said engagement portion.

9. The holder of claim 7, wherein said means for spacing said engagement portion from said mounting structure comprises at least one spacing arm at each lateral side of said mounting structure, said spacing arms being connected between said mounting structure and said engagement portion.

10. The holder of claim 8, wherein said mounting structure comprises a double-sided adhesive pad for engaging said mounting structure and a surface to be mounted.

11. The holder of claim 9, wherein said mounting structure comprises a double-sided adhesive pad for engaging said mounting structure and a surface to be mounted.

12. The holder of claim 7, wherein said at least one tab is provided substantially beneath said slot.

13. The holder of claim 12, wherein said tab portions are substantially planar members.

14. The holder of claim 13, wherein said tabs are substantially horizontally aligned.

15. The holder of claim 13, wherein said tabs are substantially vertically aligned.

* * * * *